United States Patent [19]
Kitano et al.

[11] 3,766,972
[45] Oct. 23, 1973

[54] HEAT EXCHANGING APPARATUS

[75] Inventors: Masao Kitano, Nagoya; Yasuo Kondo, Anjo, both of Japan

[73] Assignees: Nippondenso Co. Ltd., Aichi-ken; Toyota Jidosha Kogyo Kabushiki Kaisha, Toyota-shi; Kabushiki Kaisha Toyota Chuo Kenkyusho, Aichi-ken, Japan

[22] Filed: Dec. 20, 1971

[21] Appl. No.: 209,706

[30] Foreign Application Priority Data
Dec. 26, 1970 Japan .............................. 45/128993

[52] U.S. Cl. ...................... 165/8, 64/27 R, 64/27 L, 74/446
[51] Int. Cl. ............................................. F28d 19/04
[58] Field of Search ................... 165/8, 10; 74/446; 64/15 R, 27 R, 27 L

[56] References Cited
UNITED STATES PATENTS

| 3,301,317 | 1/1967 | Weaving et al. | 165/10 X |
| 3,392,776 | 7/1968 | Topouzian | 165/10 X |
| 3,401,741 | 9/1968 | Paluszny et al. | 165/8 |
| 3,430,687 | 3/1969 | Wardale | 165/8 |
| 3,496,993 | 2/1970 | Azelborn | 165/8 |
| 1,843,567 | 2/1932 | Lambert | 64/27 L |
| 3,464,233 | 9/1969 | Brouwers et al. | 64/27 L |

*Primary Examiner*—Albert W. Davis, Jr.
*Attorney*—Cushman et al.

[57] ABSTRACT

A heat exchanging apparatus having a disc-like body of a perforated material adapted to be rotated in heat transfer contact with fluids to be heat-exchanged. A drive ring is provided concentrically around the disc-like body. The drive ring is drivingly connected to the disc-like body by means of a plurality of arcuate leaf springs mounted therebetwen and each secured at its central portion to the drive ring and at its one end to the disc-like body. The other end of each spring is slidable a distance with respect to the disc-like body circumferentially thereof to prevent buckling deformation of the other end due to compression force imparted by the drive ring. The transmission of torque from the drive ring to the disc-like body is effected by virtue of the tension in the one end of each leaf spring whereby buckling of the one end is prevented.

6 Claims, 5 Drawing Figures

PATENTED OCT 23 1973　　　　　　　　　　　　　　　3,766,972

Masao KITANO
Yasuo KONDO
INVENTORS

BY
Cushman, Darby & Cushman
ATTORNEY

HEAT EXCHANGING APPARATUS

BACKGROUND OF THE INVENTION

1. Field of the Invention

The present invention relates to a heat exchanging apparatus of the type that includes a disc-like body of a perforated material adapted to be rotated in heat transfer contact with heat exchanging media such as air and combustion products exhausted, for example, from a gas turbine engine for the heat exchange of the heat exchanging media.

2. Description of the Prior Art

As an example, a heat exchanging apparatus of this kind and which is designed for use with a gas turbine engine has a disc-like heat accumulating and exchanging body of a material, such as, a ceramic material which is perforated to pass therethrough air and combustion products from the gas turbine engine. In order that the disc-like body may be driven by a motor through torque transmitting means such as chain or the like, the apparatus is provided with a drive ring disposed around the disc-like body and having thereon sprockets for driving engagement with the chain. So as to prevent separation of the disc-like body and the drive ring from each other due to the thermal expansion of the members and, in particular, of the drive ring and so as to transmit the drive force from the drive ring to the disc-like body uniformly in circumferential direction thereof, a generally annular but corrugated leaf spring of a unitary or single piece structure is mounted between the outer peripheral surface of the disc-like body and the inner peripheral surface of the drive ring. These peripheral surfaces are formed therein with recesses to provide for face to face contact with the corrugations on the leaf spring. The torque imparted to the drive ring is transmitted to the leaf spring by the face to face contact therebetween and the torque is then transmitted from the leaf spring to the disc-like body by the face to face contact therebetween.

With the above-discussed prior art apparatus, the leaf spring is not fixedly secured to the disc-like body and the drive ring but is merely in abutment contact at the corrugations with the recesses in the disc-like body and drive ring so that the transmission of the torque from the drive ring to the disc-like body is performed merely by virtue of the abutment contact between the three members. This arrangement, therefore, has a disadvantage that the torque on the drive ring causes the leaf spring to have buckling deformation produced therein with an unstable torque transmission to the disc-like body. In addition, the prior art apparatus is not provided with any appropriate means for dealing with or taking up the thermal expansion of the leaf spring. This also causes the leaf spring to have unnecessary buckling deformation which leads to disadvantageous unstable torque transmission and damage of the leaf spring.

SUMMARY OF THE INVENTION

It is an object of the present invention to provide an improved heat exchanging apparatus of the above-specified class in which a plurality of arcuate leaf springs are mounted between a drive ring and a disc-like heat accumulating and exchanging body in such a manner that the leaf springs are not caused to have any buckling deformation by the thermal expansion and by the transmission of torque from the drive ring to the disc-like body to thereby assure a reliable and stable transmission of the torque from the drive ring to the disc-like body.

It is another object of the present invention to provide an improved heat exchanging apparatus of the class specified in the above and in which each of the leaf springs is secured at a central portion to one of the drive ring and the disc-like body and at one end to the other of the drive ring and the disc-like body and in which the leaf spring is engaged at its other end with the other of the drive ring and the disc-like body for relative sliding lost motion a predetermined distance with respect thereto in circumferential direction thereof so that the torque transmission is performed by virtue of the tension in the one end of each leaf spring so as to prevent the leaf springs from suffuring from buckling deformation.

It is a further object of the present invention to provide an improved heat exchanging apparatus of the class specified in the above and in which the disc-like body includes a protection ring provided on the outer peripheral surface thereof and in which the protection ring has means for distributing the pressure forces of the ends of each leaf spring over widened areas of the protection ring.

According to the present invention, there is provided a heat exchanging apparatus comprising a disc-like heat accumulating and exchanging body adapted to be rotated in heat transfer contact with heat exchanging media one of which is at a temperature higher than the other, a ring member of a metal disposed concentrically around the disc-like body, the ring member being spaced radially outwardly from the outer peripheral surface of the disc-like body to define therebetween an annular gap, a plurality of leaf springs disposed in the annular gap and arranged to extend substantially circumferentially thereof, each of the leaf springs having an arcuate shape and being secured at a central portion to one of the disc-like body and the ring member, each leaf spring having one end secured to the other of the disc-like body and the ring member and the other end engaged with the other member for relative movement with respect thereto a predetermined distance circumferentially of the disc-like member, the ring member being adapted to be rotated in a direction to impart a tension force to each of the leaf spring at the one end for driving the disc-like body in that direction whereby the circumferential portions thereof are successively brought into heat transfer contact with the heat exchanging media for the heat exchange therebetween.

The above and other objects, features and advantages of the invention will become apparent from the following description with reference to the accompanying drawings.

DESCRIPTION OF A PREFERRED EMBODIMENT

Figure 1:
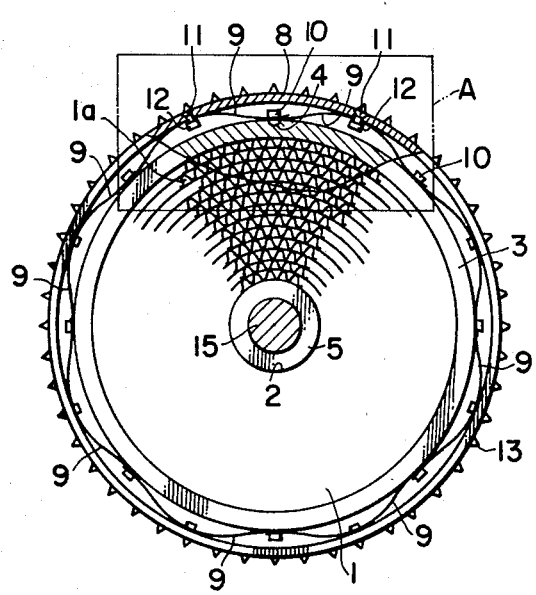
FIG. 1 is a partial sectional front view of an embodiment of the heat exchanging apparatus according to the present invention.
Figure 2:
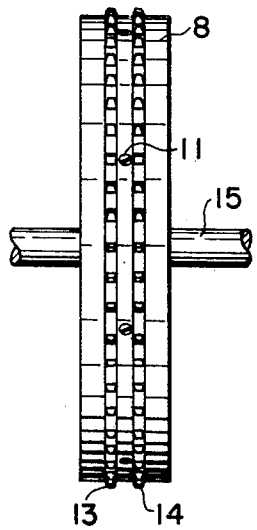
FIG. 2 is a side view of the apparatus shown in FIG. 2.
Figure 3:
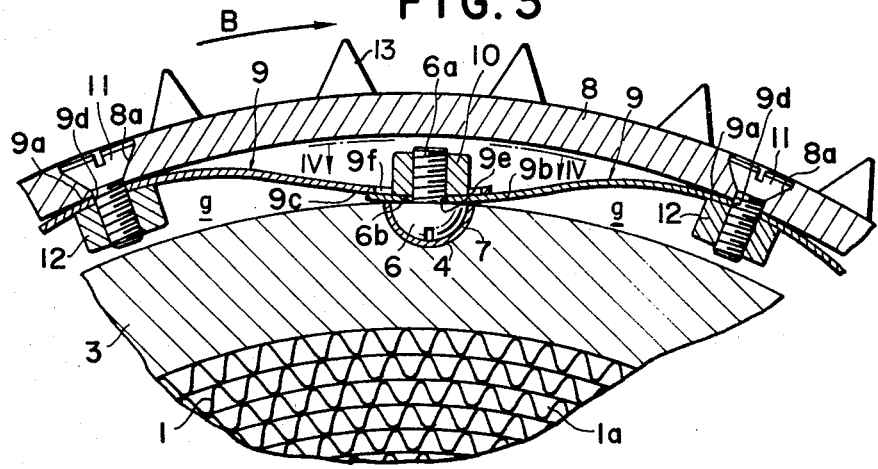
FIG. 3 is a fragmentary sectional view illustrating in larger scale the part of the apparatus surrounded by a broken line A in FIG. 1.

Referring first to FIGS. 1 to 3 of the drawings, the apparatus according to an embodiment of the present invention includes a disc-like heat accumulating and exchanging body 1 which is preferably made of a ceramic material having a small thermal expansion coefficient. The body 1 is perforated or formed therein with a plurality of apertures 1a for passing the flow of air and a heated gas such as combustion products from a gas turbine engine.

An axial bore 2 is formed in the body 1 centrally thereof. A bushing 5, preferably of a ceramic material having the same thermal expansion coefficient as that of the disc-like body 1, is fixedly mounted in the bore 2 by means of a cement so as to protect the bore 2 which otherwise is required to serve as a bearing of the apparatus.

In the illustrated embodiment, the apparatus is preferably provided with a protection ring 3 secured to the peripheral outer surface of the disc-like body 1 by means of a cement so as to protect the body 1. The protection ring 3 is preferably made of a ceramic material having a thermal expansion coefficient the same as that of the disc-like body 1. A plurality of axial key grooves 4 are formed in the outer peripheral surface of the protection ring 3 at an equal interval although only one of the grooves 4 is shown in FIGS. 1 and 3. A key 6 of a cross-section substantially complementary to the cross-sectional configuration of the grooves 4 is received in each of the grooves with a gasket material 7 interposed therebetween. The key 6 has a stud portion 6 which preferably is integral therewith and projects radially outwardly from the outer surface of the key 6 for the purpose to be made apparent later. Preferably, the key 6 and the stud portion 6a are formed of a headed bolt, as shown. When such a bolt is used, the groove 4 may be a circular recess having a spherical surface for receiving the bolt head with a gasket material 7 interposed therebetween.

A drive ring 8 of a metal having a diameter larger than that of the protection ring 3 is disposed coaxially with and around the ring 3 with an annular gap g defined therebetween. The drive ring 8 is formed therein with countersunk holes 8a drilled through the wall of the ring 8. The holes 8a correspond in number to the grooves 4 in the protection ring 3. The rings 3 and 8 are supported in position by means of a plurality of leaf springs 9 disposed in the annular gap g in a manner to be described hereunder.

Each of the leaf springs 9 has an arcuate shape in side view, as best seen in FIG. 3, and has a longitudinal central portion 9a and opposite end portions 9b and 9c. The central portion 9a and one of the end portions 9b are formed therein with apertures 9d and 9e, respectively, while the other end portion 9c is formed therein with an elongated slot 9f. Each of the arcuate leaf springs 9 is secured at the central portion 9a to the inner peripheral surface of the drive ring 8 by means of a countersunk head screw 11 extending through one of the holes 8a in the drive ring 8 and the aperture 9d in the central portion of the leaf spring 9. A nut 12 is screwed down onto the screw 11 to urge the spring central portion 9a against the inner peripheral surface of the drive ring 8. The leaf spring 9 is forcibly deformed from its original arcuate configuration and is in pressure contact at one end 9b with the outer surface 6b of one of the keys 6 with the stud 6a thereof extending through the aperture 9e in the end 9b of the leaf spring 9. This end of the leaf spring is secured to the key 6 by a nut 10 threaded down onto the stud 6a thereof as best seen in FIG. 3.

Figure 4:
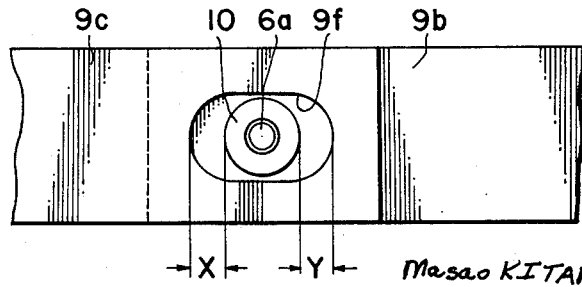
FIG. 4 is a fragmentary plan view taken substantially along line IV—IV in FIG. 3 illustrating in larger scale the mechanical relationship between the adjacent ends of an adjacent pair of leaf springs and bolt and nut assembly which connects the springs to a heat accumulating and exchanging body.

Another leaf spring 9 adjacent the described leaf spring is secured at the central portion 9a and one end portion 9b to the outer and inner rings 8 and 3 in a similar manner. The other leaf spring 9 has the other end portion 9c which is in overlapping pressure contact with the outer surface of the end portion 9b of the preceding leaf spring 9. It will, however, be appreciated that since the end portion 9c of the succeeding leaf spring 9 has a slot 9f, the nut 10 loosely extends through the slot 9f in the succeeding spring with gaps X and Y defined in circumferential direction between the outer peripheral surface of the nut 10 and the opposite ends of the slot 9f, as best seen in FIG. 4. It is, therefore, appreciated that the end portion 9c of the succeeding leaf spring 9 is slidable a distance X or Y with respect to the nut 10 in a circumferential direction of the ring 3. In the described manner, all of the other leaf springs 9 are mounted around the inner and outer peripheral surfaces of the drive and protection rings 8 and 3, so that the protection ring 3 and the disc-like body 1 are resiliently supported centrally of the drive ring 8.

As will be seen in FIG. 2, sprockets 13 and 14 are secured to the outer peripheral surface of the drive ring 8 along a pair of circular zones in the peripheral surface parallel with the end faces of the ring 8 by any of conventional means such as welding. The assembly consisting of the afore-described elements is rotatably supported by a fixed shaft 15 extending through the bushing 5 mounted on the disc-like body 1.

Figure 5:
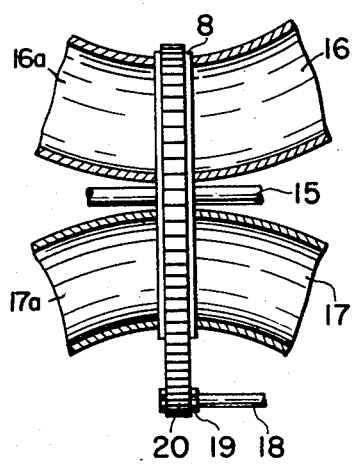
FIG. 5 illustrates in reduced scale the apparatus of the invention which is installed for practical operation.

FIG. 5 illustrates the apparatus when installed for practical operation. A pair of axially aligned conduits 16 and 16a for air flow are disposed on both sides of the perforated disc-like body 1 with the adjacent ends of the conduits positioned in close contact with the opposite end faces of the body 1. Another axially aligned pair of conduits 17 and 17a are arranged in a similar manner for passing therethrough a heated fluid such as combustion products from a gas turgine engine. The apparatus is adapted to be driven by means of a drive shaft 18 operatively connected at one end with a motor such as a gas turbine engine or an electric motor (not shown). The drive shaft 18 is provided at its free end with a sprocket wheel 19 which is drivingly connected with the sprockets 13 and 14 on the drive ring 8 by means of an endless chain 20 extending therearound.

The speed reduction ratio of the sprocket wheel 19 with respect to the sprockets 13 and 14 is preferably such that the disc-like body 1 is rotated at 20 r.p.m. In operation, the torque from a motor is transmitted through the drive shaft 18, the sprocket wheel 19 and the chain 20 to the sprockets 13 and 14 which in turn transmit the torque through the drive ring 8, the screws 11 thereon and the leaf springs 9 to the keys 6 from which the torque is transmitted through the gasket materials 7, the protection ring 3 and the disc-like body 1 to the bushing 5 so that the members are rotated about the axis of the shaft 15 at, for example, 20 r.p.m. The successive portions of the disc-like body 1 in circumferential direction thereof are heated by the combustion products flowing through the conduits 17 and 17a as the disc-like body 1 is continuously rotated. Since the body 1 is so rotated, the successive heated portions of the body 1 are successively brought into heat transferring contact with the air flowing through the air conduits 16 and 16a so that substantial parts of the heat of the combustion products flowing through the conduits 17 and 17a are transferred by the disc-like body 1 to the air flowing through the air conduits 16 and 16a.

The combustion products flowing through the conduits 17 and 17a are at an elevated temperature which, in general, is higher than 200°C. The bushing 5, the disc-like body 1 and the protection ring 3 are thus caused to have thermal expansion which, however, develops to the same extent on these members because they are made of ceramic materials of the same thermal expansion coefficients, as described previously, and thus there is produced no gap or clearance between these ceramic members. The drive ring 8 is also caused to have a thermal expansion which is much greater than that of the ceramic members 1, 3 and 5 because the drive ring 8 is made of a metal and, therefore, the ring 8 is caused to have a diameter much increased as compared with the increased diameter of the protection ring 3. The thermal expansion of the drive ring 8, however, causes the resilient leaf springs 9 to have such a slight deflection that the mechanical connection between the protection and drive rings 3 and 8 is not caused to have any inconvenience for the operation.

In addition, since the leaf springs 9 are so designed that their ends 9c can have sliding lost motion a distance X or Y in a circumferential direction with respect to their associated nuts 10 as shown in FIG. 4, the drive and protection rigns 8 and 3 are allowed to have a relative rotational movement with respect to one another. The rings are also allowed to have a relative radial movement with respect to one another owing to the radial deflection of the leaf springs 9. Thus, the coaxial arrangement of the rings 3 and 8 does not restrain the leaf springs 9 from having a relative thermal expansion generally in circumferential direction of the apparatus with respect to the protection ring 3, with a resultant advantage that the leaf springs 9 are not caused to have any unstable buckling deformation produced therein.

When a torque is imparted to the drive ring 8 in a direction indicted by an arrow B in FIG. 3, the disc-like body 1 has a rotational resistance in the opposite direction. This rotational resistance imparts a compression force to the end portion 9c of each leaf spring 9. The end portion 9c, however, can have a circumferential sliding movement a distance X with respect to the peripheral surface of the protection ring 3 and, thus, is not caused to have a disadvantageous buckling deformation produced therein. At the same time, the other end portion 9b of the leaf spring 9 is subjected to a tension because this end portion is fixed to the protection ring 3 by means of an associated key 6 and its stud 6a against relative movement with respect to the ring 3. The end portion 9b of the leaf spring 9, therefore, is not caused to have any buckling deformation produced therein. The tension force is transmitted to the protection ring 3 and the disc-like body 1 as an effective drive force therefor.

In order that the apparatus may alternatively have a similar function with respect to a rotational drive force acting in the direction opposite to that indicated by the arrow B in FIG. 3, the end portion 9b of each leaf spring 9 may be formed therein with an elongated slot through which a nut similar to the nut 10 loosely extends while the other end portion 9c may be fixed to the protection ring 3 by means of a stud on a key, similar to the stub 6a of the key 6, and an associated nut similar to the nut 10.

The torque imparted to each leaf spring 9 is transmitted through an associated key 6 and a gasket material 7 associated therewith, to the protection ring 3. It will be appreciated that since the gasket material 7 serves as a resilient element between the inner surface of the key 6 and the concave surface of the key groove 4, the drive force exerted to the key 6 is uniformly distributed or dispersed by the gasket material 7 over a widened area of the protection ring 3, i.e., the concave surface of the key groove 4 rather than being concentrated upon a spot or point on the protection ring 3, the dispersed force being a small pressure force per unit area of the concave surface of the key groove 4. In addition, the resiliency of the leaf springs 9 and the resiliency of the gasket material 7 absorb and weaken the exterior vibration and shock and, thus, are advantageously operative to prevent the vibration and shock from being directly imparted to the protection ring 3 and the disc-like body 1.

An embodiment of the present invention has been described in the above with reference to the accompanying drawings. It is to be understood that the invention is not limited to the described and illustrated embodiment but can have various modifications and changes. For example, each of the leaf springs 9 may be fixed at its central portion 9a to the outer peripheral surface of the protection ring 3 and at one end 9b to the inner surface of the drive ring 8 by means of a key and nut assembly similar to the key and nut unit 6 and 10 with an adjacent leaf spring 9 being loosely connected at its end 9c to the inner surface of the ring 8 by a nut similar to the nut 10 so that the end 9c is circumferentially slidable a predetermined distance on the inner surface of the drive ring 8. The latter may be integral with the countersunk head screws 11. The central portion 9a of each leaf spring 9 may be secured to the drive ring 8 by means of caulking rather than by a screw 11. The end 9b of the spring 9 may be similarly secured to an associated key 6 by caulking rather than by the bolt and nut.

It is also to be understood that the protection ring can be omitted and, instead, key grooves 4 may be formed in the outer peripheral surface of the disc-like body 1 itself so that keys 6 are received in the grooves 4 with gasket materials 7 interposed therebetween for the transmission of torque between related components. The chain drive system comprising the sprockets and the endless chain for the transmission of the torque from the motor to the drive ring 8 may be replaced by a belt drive system or gear train. The material of the disc-like body 1 is not limited to a ceramic material and may be another heat-resistant material having a small thermal expansion coefficient, such as a stainless steel, glass or the like. Each of the apertures or perforations in the disc-like body 1 may have any appropriate cross-sectional configuration such as, for example, polygonal, circular or wavy or corrugated configuration, so long as the perforations are enabled to pass therethrough fluids such as air and combustion products which are to be heat-exchanged. Moreover, the application of the invention is not limited to a gas turbine engine and the apparatus of the invention may be used with other kinds of internal combustion engines and boilers.

As having been described in the above, the present invention is advantageous in that the leaf springs are prevented from suffuring from buckling deformation and bending stress when they are expanded by heat and when they are operating to transmit the torque. The torque imparted to the drive ring imparts a tension to one end portion of each leaf spring so that the latter transmits the torque to the disc-like body. The compression force imparted to the other end portion of the leaf spring is substantially negligible because the compression force is taken up by a predetermined amount of sliding lost motion of the other end portion of the leaf spring with respect to the disc-like body. Thus, the compression force does not cause the other end portion of the leaf spring to have a buckling deformation produced therein. It is particularly to be noted that the transmission of the torque from the drive ring to the disc-like body relies not upon the bending-resistant rigidity of the leaf springs but advantageously upon the tension in the leaf springs whereby a stable torque transmission is carried out to advantageously drive the disc-like body.

What is claimed is:

1. A heat exchanging apparatus comprising a disc-like heat accumulating and exchanging body in heat transfer contact with heat exchanging media one of which is at a temperature higher than the other, a ring member of a metal disposed concentrically around said disc-like body, said ring being spaced radially outwardly from the outer peripheral surface of said disc-like body to define therebetween an annular gap, a plurality of leaf springs disposed in said annular gap and arranged to extend substantially circumferentially of said gap, each of said leaf springs having an arcuate shape and being secured at a central portion to one of said disc-like body and said ring member, each leaf spring having one end secured to the other of said disc-like body and said ring member and the other end engaged with said other member for relative movement with respect thereto a predetermined distance circumferentially of said disc-like body, said ring member being adapted to be rotated in a direction to impart a tension force to each of said leaf springs at said one end for driving said disc-like body in said direction whereby the circumferential portions thereof are successively brought into heat transfer contact with said heat exchanging media for the heat exchange therebetween.

2. A heat exchanging apparatus as defined in claim 1, in which said heat exchanging media are gaseous fluids and said heat accumulating and exchanging body is made of a heat-resistant material perforated to pass said heat exchanging media across the wall of said body.

3. A heat exchanging apparatus as defined in claim 2, in which said heat accumulating and exchanging body includes a protection ring of a material having a thermal expansion coefficient the same as that of said body, said protection ring being secured to the outer peripheral surface of said body and extending therearound, each of said leaf springs being secured at said central portion to the inner peripheral surface of said ring member and secured at one end to the outer peripheral surface of said protection ring, the other end of said each leaf spring being engaged with said protection ring for relative movement with respect thereto a predetermined distance circumferentially of said protection ring.

4. A heat exchanging apparatus as defined in claim 3, in which said protection ring includes means for distributing and dispersing the pressure forces of the ends of each leaf spring over widened areas of said protection ring.

5. A heat exchanging apparatus as defined in claim 4, in which said means for distributing and dispersing the pressure forces of the ends of each spring comprise a plurality of key grooves in the outer peripheral surface of said protection ring, a key member received in each of said key grooves, and a gasket material interposed between the adjacent surfaces of each pair of said key member and said key groove, each of said key member having a stud extending generally radially outwardly therefrom, said one end of each leaf spring having an aperture formed therein, said stud extending through said aperture, a nut screwed down onto said stud to hold said one end of each leaf spring against an associated key member, the other end of each leaf spring having formed therein an elongated slot of such size and configuration as to loosely receive the stud which secures the one end of a preceding leaf spring and allow said the other end to be movable a predetermined distance in circumferential directions of said protection ring.

6. A heat exchanging apparatus as defined in claim 5, in which said disc-like heat accumulating and exchanging body and said protection ring are made of ceramic materials having substantially the same thermal expansion coefficients.

* * * * *